April 25, 1967  W. G. HART  3,315,383
LAND LEVELING DEVICE
Filed July 29, 1964  3 Sheets-Sheet 1
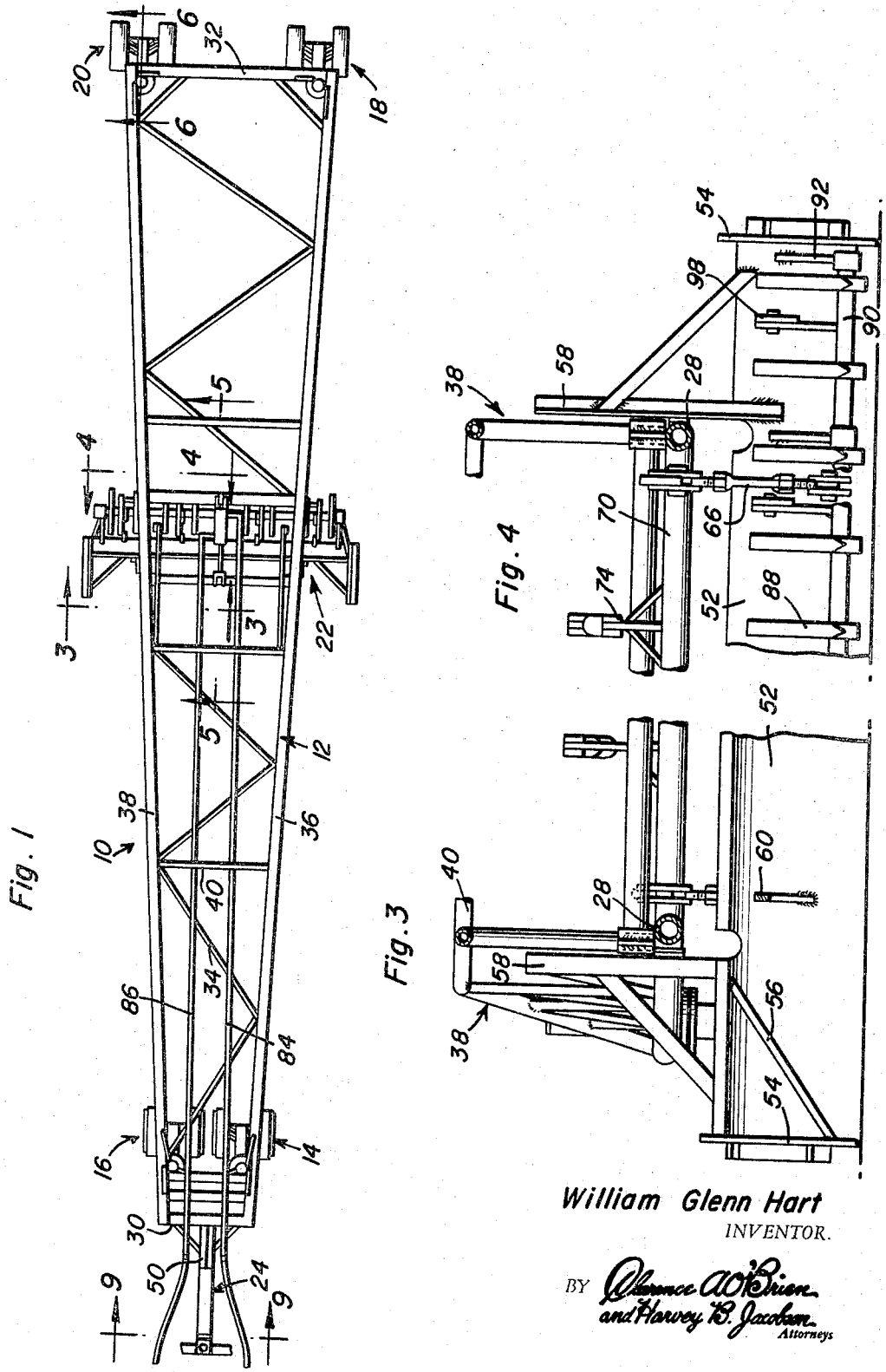
William Glenn Hart
INVENTOR.

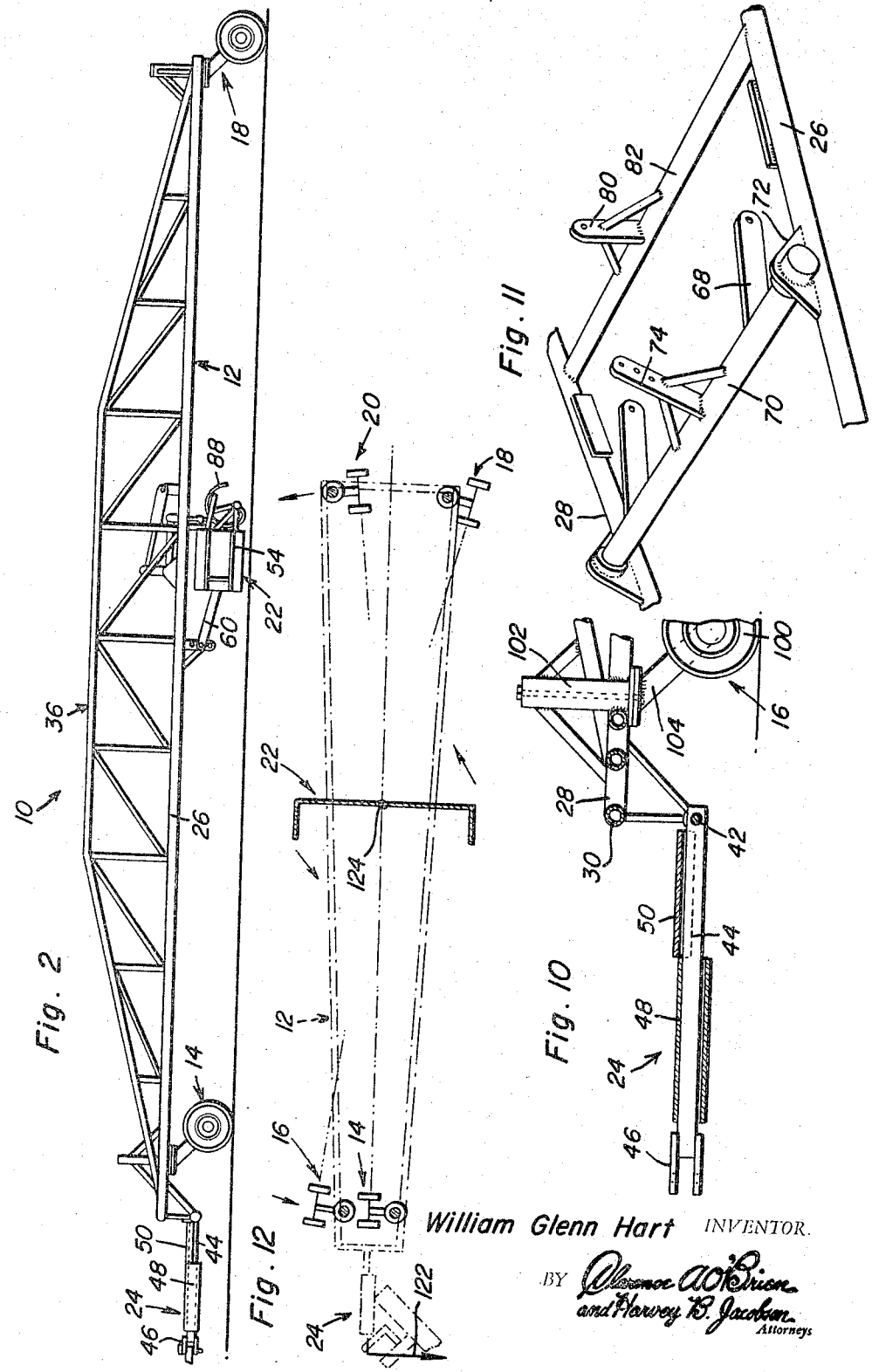

April 25, 1967  W. G. HART  3,315,383
LAND LEVELING DEVICE

Filed July 29, 1964  3 Sheets-Sheet 3

William Glenn Hart
INVENTOR.

United States Patent Office 3,315,383
Patented Apr. 25, 1967

3,315,383
LAND LEVELING DEVICE
William Glenn Hart, Box 3, Stratford, Tex. 79084
Filed July 29, 1964, Ser. No. 386,026
10 Claims. (Cl. 37—153)

This invention relates to land levelers and more particularly to improvements in the construction of land levelers.

An important object of the present invention is to provide a land leveler construction by means of which its movement and maneuverability is facilitated.

In accordance with the foregoing object, the land leveler of the present invention may be directionally controlled during forward movement by the towing vehicle and may be rotated about a stationary pivot by a pull exerted by the towing vehicle at right angles to the forward direction of movement whereby the land leveler may be reversed in direction at the end of a field for example.

It is therefore an additional object of the present invention to provide a wheeled supporting arrangement for a land leveler cooperating with a centrally mounted levelling blade for automatically producing rotation of the land leveler frame about a central pivot at the leveler blade in order to reverse the direction of the frame.

A still further object of the present invention is to provide a land leveler frame supported by caster wheel assemblies located at the forward and rear ends of the frame, the caster wheel assemblies at the rear end of the frame being more widely spaced apart in a lateral direction and provided with self-locking devices which yieldably hold the caster wheel assemblies in positions for guiding forward movement of the leveler frame. The locking devices are however automatically released so as to accommodate turning of the leveler frame about a stationary pivot when reversal of direction is desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the land leveler.

FIGURE 2 is a side elevational view of the land leveler.

FIGURE 3 is an enlarged partial transverse view taken substantially through a plane indicated by section line 3—3 in FIGURE 1.

FIGURE 4 is an enlarged sectional view taken substantially through a plane indicated by section line 4—4 of FIGURE 1.

FIGURE 10 is a partial sectional view taken substantially through a plane indicated by section line 10—10 in FIGURE 9.

FIGURE 11 is a partial perspective view of a portion of the land leveler.

FIGURE 12 is a schematic plan view illustrating the orientation of certain of the components during turning movement of the leveler.

Figure 5:
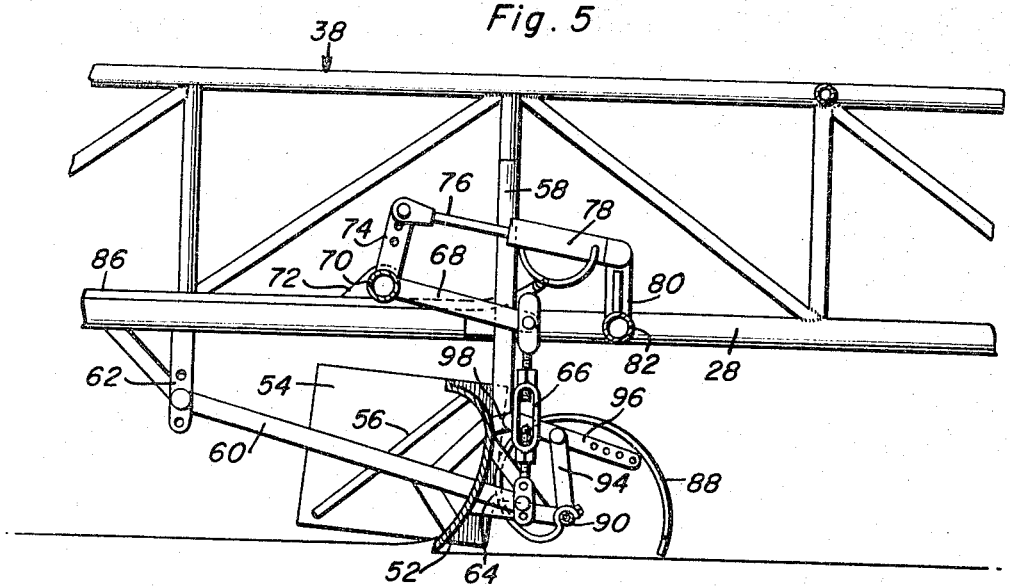
FIGURE 5 is an enlarged partial sectional view taken substantially through a plane indicated by section line 5—5 in FIGURE 1.

Referring now to the drawings in detail, the land leveler as viewed in FIGURES 1 and 2 is generally denoted by reference numeral 10. The leveler includes an elongated frame assembly generally referred to by reference numeral 12, the frame assembly being supported in spaced relation above the ground by four caster wheel assemblies including two dirigible wheel assemblies 14 and 16 mounted adjacent a forward end of the frame assembly and a pair of trailing wheel assemblies 18 and 20 operatively mounted at the rear end of the frame assembly. A leveling blade generally referred to by reference numeral 22 is also mounted in suspended relation below the frame assembly intermediate the forward and rear ends for engagement with the ground. A hitch assembly generally referred to by reference numeral 24 is secured to the forward end of the frame assembly by means of which the land leveler is coupled to the rear end of a towing tractor vehicle.

The frame assembly includes a pair of substantially horizontal side frame members 26 and 28 which are interconnected at the forward ends by the forward frame member 30 and at the rear ends by the rear frame member 32 so as to form a trapezoidal configuration with the side frame members 26 and 28 diverging from the forward end toward the rear end, as seen in FIGURE 1.

Horizontal braces 34 interconnect the side frame members 26 and 28 so as to render the frame assembly rigid in order to resist lateral deflection. Vertical truss formations 36 and 38 are secured to the side frame members 26 and 28 between the forward and rear ends so as to form a rigid construction in a vertical direction. Connecting frame members 40 are therefore interconnected between the vertical truss assemblies 36 and 38 so as to form a completely rigid frame assembly.

Figure 9:
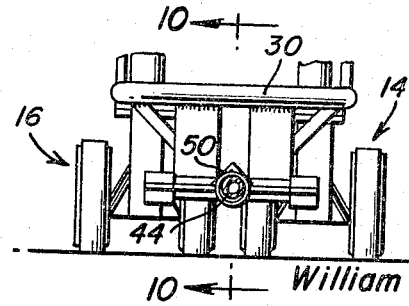
FIGURE 9 is a partial front elevational view of the land leveler.

Referring now to FIGURES 2, 9 and 10, it will be observed that the hitch assembly 24 is pivotally connected to the frame assembly 12 about a horizontal pivot shaft 42 secured to the frame assembly and suspended below the forward end frame member 30. The hitch assembly includes an elongated rod member 44 pivotally connected at a rear end to the pivot shaft 42 and having a hitch coupling 46 secured to its forward end, in order to couple the hitch assembly to the rear end of a towing vehicle so that the towing vehicle may exert its pull on the land leveler. The rear end of the towing vehicle is therefore pivotally connected by the coupling 46 to the hitch assembly so that any turning movement of the towing vehicle may directionally control movement of the land leveler. A tubular roller element 48 is therefore loosely mounted on the rod member 44 for protection thereof against abutment by the wheels of the towing vehicle when it is executing a sharp turn. The roller element 48 is therefore axially spaced on the rod member adjacent the hitch coupling 46 by means of the triangular cross section member 50 fixedly secured to the rod member. Movement may therefore be imparted to the land leveler by the towing vehicle while the leveler blade assembly 22 is in engagement with the ground in order to effect the leveling operation.

Referring now to FIGURES 5 and 11 in particular, it will be observed that the land leveler blade assembly includes a laterally enlongated earth rolling blade element 52 which extends laterally beyond the frame assembly 12. The ends of the blade element 52 are secured to rectangular end plate members 54, brace elements 56 being interconnected between the blade element and the end plate members so as to form a rigid assembly therewith. Secured to the rear sides of the blade elements on the outside of the vertical truss assemblies 36 and 38, are upwardly extending members 58 by means of which manual adjustments of the blade element may be effected. The blade element is supported in suspended relation below the frame by a pair of forwardly extending lever elements 60 which are pivotally connected to the frame by the pivot support elements 62 projecting downwardly from the frame assembly. A pair of connecting elements 64 project rearwardly from the blade element and are pivotally connected to a turnbuckle adjustment link assemblies 66 through which fine adjustment of the blade element may be effected. The turnbuckle link assemblies are therefore pivotally connected at their upper ends to lever arms 68 which project rearwardly from a pivot shaft 70 rotatably mounted between the side frame members 26 and 28 by means of upwardly extending pivot ears 72. Angular displacement of the pivot shaft 70 for raising or lowering the blade element is effected through the actuating arm 74 which projects upwardly from the pivot shaft and may be connected to the projecting end of a piston rod 76 which extends from a hydraulic cylinder device 78. The cylinder device may therefore be pivotally mounted between the side frame members 26 and 28 by the support arm 80 which projects upwardly from the cross frame member 82 and is in alignment with the actuating arm 74. A pair of fluid conduits 84 and 86 may therefore be mounted on the frame assembly and extend from the cylinder device 78 toward the forward end of the frame assembly for connection to hydraulic lines which extend from the towing tractor vehicle. In this manner, a hydraulic connection may be established to any suitable valve controlled source of fluid pressure (not shown) available on the towing vehicle by means of which the vehicle operator may lower or raise the leveler blade element. It will of course be appreciated, that other actuating facilities may be provided for raising and lowering the leveler blade. The leveler blade element 52 may also mount rearwardly thereof, a plurality of laterally spaced ground chiseling spring teeth 88. Accordingly, a mounting shaft 90 may be supported in parallel spaced relation to the blade element by means of a plurality of supporting arms 92 which project rearwardly therefrom. The spring teeth 88 are therefore secured to the shaft 90 and are angularly adjustable therewith relative to the supporting arms 92 by means of the adjusting arms 94 which extend upwardly therefrom and are pivotally connected to the adjustable link elements 96 which in turn are pivotally connected to rearwardly projecting arms 98 secured to the leveler blade element.

The caster wheel assemblies 14 and 16 at the forward end of the frame assembly are similar in construction. Each of these caster wheel assemblies are therefore provided with a pair of wheel elements 100 interconnected by an axle which is rotatably mounted in spaced relation to a vertical steering axis established through a steering post 102 as more clearly seen in FIGURE 10. The steering post is fixedly mounted by the frame assembly in spaced adjacency to the forward end so as to freely rotatably mount the axle supporting member 104 which extends at an angle to the vertical steering axis. Each of the wheel assemblies 14 and 16 will therefore assume a position relative to the frame assembly so as to bring the wheel axles into perpendicular relation to the towing pull exerted by the tractor vehicle on the frame as is well known in connection with caster wheel action. Accordingly, the wheel axles supporting members 104 must be freely mounted for rotation about the vertical steering axes extending through the steering post 102.

Figure 6:
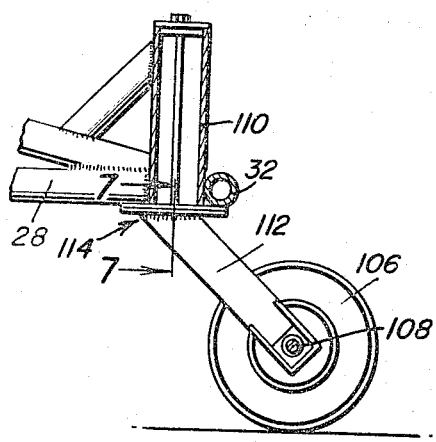
FIGURE 6 is an enlarged partial sectional view taken substantially through a plane indicated by section line 6—6 in FIGURE 1.
Figure 8:
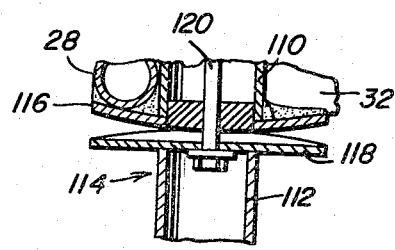
FIGURE 8 is a partial sectional view similar to that of FIGURE 7 but showing the parts in another operative position.
Figure 7:
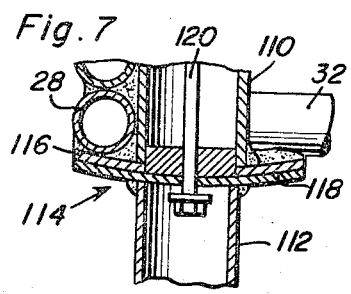
FIGURE 7 is a partial sectional view taken substantially through a plane indicated by section line 7—7 in FIGURE 6.

The trailing wheel assemblies 18 and 20 also involve caster wheel action because of the constructional arrangement thereof which is similar to that of the forward wheel assemblies 14 and 16. Accordingly, each of the trailing wheel assemblies also includes a pair of wheel elements 106 interconnected by an axle 108 which is spaced from the vertical steering axis extending through the steering post 110 associated with the trailing wheel assemblies as more clearly seen in FIGURE 6. The axle suporting member 112 therefore also extends at an angle to the vertical steering axis extending through the steering post 110. However, the angular position of the trailing wheel assemblies relative to the frame assembly are influenced by self-locking devices generally referred to by reference numeral 114. As more clearly seen in FIGURE 7, the lower end of the steering post 110 has secured thereto a fixed plate member 116 having the same curvature as a bearing plate member 118 secured to the upper end of the axle supporting member 112. Accordingly, it will be apparent that the load of the frame on the trailing wheel assemblies will yieldably lock the trailing wheel assemblies in an angular position relative to the frame assembly in which the fixed plate member and bearing plate member curvatures mate with each other as illustrated in FIGURE 7. This angular position is such as to align the axles 108 of the trailing wheel assemblies perpendicular to the forward direction of movement. Accordingly, directional control over the land leveler may be effected in view of the fact that the forward wheel assemblies 14 and 16 are dirigible wheels or capable of being freely turned by the directional pull exerted on the frame by the towing vehicle. However, the locking devices 114 associated with the trailing wheel assemblies will yield when the turning forces are sufficient to cause angular displacement of the axle supporting members 112 and the bearing plate members 118 secured thereto about the steering axes extending through the pivot bolts 120 within the steering posts 110. Thus, the self-locking devices 114 will unlock under such conditions to accommodate free angular displacement of the trailing wheel assemblies relative to the steering axes as shown in FIGURE 8. The aforementioned conditions under which the locking devices 114 release, occur when the towing vehicle exerts a pull through the hitch assembly 24 in a direction perpendicular to the forward direction of movement as diagrammatically illustrated in FIGURE 12.

It will be observed from FIGURE 12 that when the towing vehicle exerts a pull in a direction perpendicular to the forward direction of movement as indicated by the arrow 122, one of the forward caster wheel assemblies 14 will swing into a position wherein its axle is aligned with the longitudinal axis of the leveler frame assembly producing a moment about some central pivot 124 established in the ground by the blade assembly 22. Under such conditions, the force exerted by the towing vehicle will be sufficient to cause the locking devices 114 to yield resulting in the angular displacement of the trailing wheel assemblies 18 and 20 so that they may then exhibit caster wheel action. The leveler frame assembly will then be rotated about the stationary pivot 124 established by the blade assembly so as to reverse the position of the leveler within a minimum of space. Once the towing vehicle resumes a position exerting a pull in a forward direction of the leveler frame assembly, the forward caster wheel assemblies 14 and 16 will assume positions with their axles perpendicular to the direction of pull. When this occurs, the trailing wheel assemblies will of course again be yieldably locked in position by the locking devices 114 in order to permit the towing vehicle to exercise directional control over the leveler frame as in the usual case with a trailing vehicle. It will also be apparent, that to achieve the stationary turning action aforementioned, the spacing of the forward wheel assemblies must be substantially closer than the spacing between the trailing wheel assemblies which accounts for the trapezoidal configuration of the frame assembly in the horizontal plane.

From the foregoing description, the construction, operation and utility of the land leveler device of the present invention will be apparent. It will therefore be appreciated that the land leveler of the present invention will be endowed with maneuverability as well as smooth land leveling capabilities. In view of these attributes, the land leveler of the present invention will require less adjustments, and less maintenance or repair because of wearing parts.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A land leveler comprising, an elongated frame having a forward end and a rear end, a pair of caster wheel assemblies mounted by the frame at each of said forward and rear ends, means yieldably resisting angular displacement of the wheel assemblies at the rear end of the frame about laterally spaced vertical axes, a leveling blade mounted by the frame intermediate the forward and rear ends and means rotatably mounting said wheel assemblies at the forward end of the frame for free angular displacement about vertical axes spaced closer to each other than said axes at the rear end of the frame.

2. In combination with a towing vehicle, a land leveler comprising, an elongated frame adapted to be towed by the vehicle in a forward direction, dirigible wheel means operatively mounted by the frame about steering axes adjacent a forward end thereof, trailing wheel means operatively mounted by the frame about steering axes adjacent a rear end thereof, self-locking means yieldably positioning said trailing wheel means relative to the frame for movement thereof under directional control of the towing vehicle and the dirigible wheel means, a leveling blade, and means mounting the leveling blade on the frame to establish a turning pivot operative to release the self-locking means for rotation of the frame about said pivot by the towing vehicle.

3. In combination with a towing vehicle, a land leveler comprising, an elongated frame adapted to be towed by the vehicle in a forward direction, dirigible wheel means operatively mounted by the frame about steering axes adjacent a forward end thereof, trailing wheel means operatively mounted by the frame about steering axes adjacent a rear end thereof, a leveling blade mounted by the frame intermediate the forward and rear ends for engagement with the ground, locking means resisting angular displacement of the trailing wheel means about said steering axes for directional control of the frame by the towing vehicle, and means rotatably mounting the dirigible wheel means about said steering axes operative to establish a turning pivot at the leveling blade in response to a pull exerted by the towing vehicle perpendicular to said forward direction causing release of said locking means.

4. The combination of claim 3 wherein said locking means includes, fixed surface means secured to the frame, and bearing surface means secured to the trailing wheel means and engageable with the fixed surface means, said surface means having parallel curvatures mating with each other when the trailing wheel means is positioned for movement of the frame in the forward direction.

5. A land leveler comprising an elongated frame, wheel assemblies adjacent each end of said frame, leveling blade means mounted on said frame between the wheel assemblies, and means interconnecting said frame and blade means for raising and lowering the blade means to enable the blade means to be lowered to form a pivot for the frame during rotation thereof about a generally vertical central axis, each wheel assembly including a pair of laterally spaced caster wheels, and means releasably locking the rear caster wheels with the rotational axes thereof disposed transversely of the frame, to hold the frame straight behind the towing vehicle, said locking means being releasable in response to swiveling movement of the caster wheels.

6. The land leveler as defined in claim 5 wherein each of said locking means includes a pair of plates in surface to surface engagement, one of said plates being rigidly affixed to the frame, the other of said plates being secured to the caster wheel, said plates having the engaging surfaces complementarily curved with a pair of diametrically arranged high points and a pair of diametrically arranged low points whereby the caster wheels will be automatically released upon application of lateral thrust tending to swivel the caster wheels sufficient to overcome the forces created by the weight of the frame on the curved plate surfaces.

7. The land leveler as defined in claim 5 wherein said frame includes a tongue extending forwardly from the front thereof for articulate connection with a towing vehicle, means on said frame engaged with the tongue to prevent horizontal swinging movement of the tongue while enabling vertical swinging movement thereof, and rotatable means mounted on said tongue for rollingly engaging a tire of a towing vehicle in the event of engagement therewith when turning.

8. The land leveler as defined in claim 7 wherein said leveling blade means is in the form of a transversely extending blade, a plurality of spaced trench forming teeth disposed behind the blade to form a plurality of longitudinal trenches in the surface leveled by the blade thereby reducing erosion of the soil, means adjustably mounting the trench forming teeth directly on said blade for movement therewith, and forwardly extending end portions on said transversely extending blade for retaining soil forwardly of the blade.

9. In an elongated towed implement including an elongated frame having a working implement mounted adjacent the center thereof adapted to be oriented in working engagement with the ground surface, pivotal front wheel means carried by the forward end portion of the frame, a pair of laterally spaced caster wheels carried by said frame for swiveling movement about generally vertical axes, means interconnecting each caster wheel and the frame for yieldably retaining the caster wheels rotatable about a transverse axis perpendicular to the path of movement of the frame, said means being automatically released when the frame is moved in a rotational direction by exerting lateral thrust on the front end portion of the frame for pivoting the frame about the working implement whereby the lateral force is sufficient to pivot the caster wheels about their vertical axes of movement by overcoming the releasable means solely in response to rotational movement of the frame about the working implement.

10. The structure as defined in claim 9 wherein said releasable means includes engageable cam means mounted on the frame and caster wheel with the cam means having a low position when the caster wheels are in their straight line position and a high position when the caster wheels are pivoted whereby the force required to move the cam means from the low position to the high position will tend to retain the wheels in straight line condition but permit yielding swiveling movement thereof when lateral force is exerted on the frame by rotating the frame about the center thereof.

References Cited by the Examiner

UNITED STATES PATENTS

| | | | |
|---|---|---|---|
| 520,645 | 5/1894 | Jones | 172—386 X |
| 823,872 | 6/1906 | Jones | 37—146 |
| 1,540,729 | 6/1925 | York | 37—145 |
| 2,042,196 | 5/1936 | Senz | 37—145 |
| 2,124,625 | 7/1938 | Marvin | 37—153 |
| 2,314,888 | 3/1943 | Manning | 37—180 |
| 2,444,977 | 7/1948 | Clark | 37—153 |
| 2,526,130 | 10/1950 | Gurries et al. | 37—152 |
| 2,586,977 | 2/1952 | Moody | 37—180 |
| 2,624,133 | 1/1953 | Smeed | 37—150 |
| 2,700,234 | 1/1955 | Higley | 37—145 |

(Other references on following page)

UNITED STATES PATENTS

| | | | |
|---|---|---|---|
| 2,752,747 | 7/1956 | Olsen | 280—457 X |
| 2,843,948 | 7/1958 | Lindeman et al. | 37—178 |
| 2,889,153 | 6/1959 | Kowalik | 56—322 X |
| 3,036,392 | 5/1962 | Marvin | 37—180 |
| 3,080,666 | 3/1963 | Murray et al. | 37—180 |
| 3,141,250 | 7/1964 | Eddins | 37—180 |
| 3,176,457 | 4/1965 | Van DerLely | 56—322 X |

ABRAHAM G. STONE, *Primary Examiner.*

JOE O. BOLT, Jr., WILLIAM A. SMITH III,
*Examiners.*